Patented Mar. 13, 1951

2,545,317

UNITED STATES PATENT OFFICE 2,545,317

SOLUTION OF A CONJOINT POLYMER OF VINYLIDENE CHLORIDE AND ETHYL ACRYLATE

René Emile Fernand Stuchlik, Villeurbanne, France, assignor to Societe Rhodiaceta, Paris, France, a French company No Drawing. Application September 16, 1947, Serial No. 774,435. In France October 1, 1946

1 Claim. (Cl. 260—30.4)

The present invention relates to the manufacture of solutions of polyvinyl derivatives, and more particularly to the manufacture of solutions of synthetic resins resulting from the copolymerization of vinylidene chloride.

According to the invention disclosed in copending application Ser. No. 756,802, filed June 24, 1947, now Patent No. 2,481,294, solutions of polymerized vinyl compounds are obtained by employing as solvents, if desired with the application of pressure and heat, mixtures of two or more liquids, one of which is carbon disulfide, and this process is particularly applicable to polymers of high molecular weight composed entirely or partially of polyvinyl chloride. In carrying out the invention of said application Ser. No. 756,802, the liquid or liquids utilized together with carbon disulfide may be in themselves actual solvents for the polymers or they may be latent solvents or swelling agents, or even non-solvents. These liquids, which may be used together with carbon disulfide, may be aliphatic, carbo-cyclic or heterocyclic compounds, such as hydrocarbons, halogenated hydrocarbons, nitro derivatives, alcohols, ketones, esters, formals, acetals, benzals and other reaction products resulting from the action of an aldehyde on an alcohol. Examples of particularly useful substances are: methylene chloride, di-, tri- and tetra-chloro-ethane, monochloro benzene, tetrahydrofurfuryl alcohol, acetone, methyl-ethyl ketone, cyclopentanone, cyclohexanone, ethyl acetate, benzyl acetate, methyl salicylate, nitrobenzene, glycol-formal, dioxane, isophorene, triacetin, and tetrahydrofurane.

According to the present invention, it has now been found that the mixtures used as solvents according to the invention of the above mentioned co-pending application Ser. No. 756,802, represent excellent solvents not only for the polymers contemplated in the invention of said application, but also for synthetic resins resulting from the copolymerization of vinylidene chloride. The solvent mixtures used contain preferably at least 30% and not more than 70% of carbon disulfide.

As examples of copolymers, which may be used according to the present invention, the following may be particularly mentioned: copolymers of vinylidene chlorides and unsaturated esters; copolymers of vinylidene chloride and vinyl chloride, and the like.

To the solutions obtained according to this invention, any suitable supplementary material, such as pigments, plasticizing agents, anti-electrifying agents, coloring matters, or ingredients adapted to form coloring agents, and the like may be added, in a manner similar to that applied to the solutions according to said application Ser. No. 756,802. These solutions may be utilized for any application, such as varnish, coating composition, electric insulator, films, sheets, threads, fibres, bristles, foils, and the like.

The invention is illustrated by the following non-limitative examples:

*Example 1.*—The starting material is a copolymer consisting of 92.5% of vinylidene chloride and 7.5% of ethyl acrylate, a 5% solution of which in tetrahydrofurane has a viscosity of 5.6 centipoises at ordinary temperature. This copolymerization product is dissolved in a ternary mixture of equal parts of tetrahydrofurane, carbon disulfide, and acetone, and yields a solution having a viscosity of 3.7 centipoises only.

This solution is used for varnishing of electric wires. A very resistant film of high insulating capacity is thus obtained.

*Example 2.*—A copolymer of 92.5% of vinylidene chloride and 7.5% of ethyl methacrylate is used, which merely swells in dioxane, even at elevated temperatures. From this copolymer, a solution of about 30% in a mixture of equal volumes of carbon disulfide and dioxane is prepared by malaxation at about 80° C. A solution is thus obtained which is suitable for dry spinning and yields threads of good dynamometrical properties.

*Example 3.*—The starting material is a strongly polymerized copolymer consisting of 75% of vinylidene chloride and 25% of vinyl chloride, which is soluble in tetrahydrofurane only while yielding viscous solutions.

From this copolymer a solution containing 25% of said copolymer is prepared in a mixture of equal parts of volume of tetrahydrofurane, carbon disulfide and acetone. A fluid solution is obtained which is well suitable for the preparation of varnishes.

The solutions obtained according to the present invention may be used, for example, for the manufacture of varnishes, cements, coatings, films, sheets, threads, filaments, bristles, cast or molded articles which may be solid or hollow, if desired, with the addition of pigments, coloring matter, anti-electrifying agents, and the like.

What is claimed is:

As a new composition of matter, a solution of a synthetic resin resulting from the conjoint polymerization of vinylidene chloride and ethyl acrylate, said resin containing 92.5% of vinylidene chloride in the polymer, in a solvent mixture consisting of equal parts by volume of carbon disulfide, tetrahydrofurane and acetone.

RENÉ EMILE FERNAND STUCHLIK.

REFERENCES CITED

The following references are of record in the file of this patent:

UNITED STATES PATENTS

| Number | Name | Date |
| --- | --- | --- |
| 2,160,903 | Reilly et al. | June 6, 1939 |
| 2,160,945 | Wiley | June 6, 1939 |
| 2,160,946 | Britton et al. | June 6, 1939 |
| 2,348,154 | Scott et al. | May 2, 1944 |